US012233689B2

(12) United States Patent
Kim et al.

(10) Patent No.: US 12,233,689 B2
(45) Date of Patent: Feb. 25, 2025

(54) FLANGE, AND PIPE AND FLANGE STRUCTURE

(71) Applicant: Hanon Systems, Daejeon (KR)

(72) Inventors: Yunjin Kim, Daejeon (KR); Kyung Tae Noh, Daejeon (KR); Yo Chan Min, Daejeon (KR)

(73) Assignee: HANON SYSTEMS, Daejeon (KR)

(*) Notice: Subject to any disclaimer, the term of this patent is extended or adjusted under 35 U.S.C. 154(b) by 167 days.

(21) Appl. No.: 18/018,426

(22) PCT Filed: Jul. 30, 2021

(86) PCT No.: PCT/KR2021/009992
§ 371 (c)(1),
(2) Date: Jan. 27, 2023

(87) PCT Pub. No.: WO2022/030895
PCT Pub. Date: Feb. 10, 2022

(65) Prior Publication Data
US 2023/0294487 A1    Sep. 21, 2023

(30) Foreign Application Priority Data

Aug. 3, 2020  (KR) .................. 10-2020-0096636

(51) Int. Cl.
*F16L 39/00* (2006.01)
*B60H 1/32* (2006.01)
*F16L 23/026* (2006.01)

(52) U.S. Cl.
CPC .......... *B60H 1/3229* (2013.01); *F16L 23/026* (2013.01); *F16L 39/00* (2013.01)

(58) Field of Classification Search
CPC .................................. F16L 39/00; F16L 41/03
See application file for complete search history.

(56) References Cited

U.S. PATENT DOCUMENTS

| 3,739,804 | A | * | 6/1973 | Dubreuil | ................. | F16L 41/03 137/269 |
| 4,721,029 | A | * | 1/1988 | Hoffman | ................. | F16L 41/03 91/520 |
| 4,732,397 | A | * | 3/1988 | Gavin | .................... | F16L 41/03 277/609 |
| 5,054,818 | A | * | 10/1991 | Briet | ....................... | F16L 41/03 285/285.1 |
| 5,513,966 | A | * | 5/1996 | Krohn | .................... | F16L 41/03 285/24 |
| 2003/0197369 | A1 | * | 10/2003 | Fukano | ................... | F16L 39/00 285/124.3 |

(Continued)

FOREIGN PATENT DOCUMENTS

| CN | 112944086 | A | * | 6/2021 | ............. | F16L 41/03 |
| CN | 113464750 | A | * | 10/2021 | ............. | F16L 41/03 |

(Continued)

*Primary Examiner* — Matthew Troutman
*Assistant Examiner* — Fannie Kee
(74) *Attorney, Agent, or Firm* — NORTON ROSE FULBRIGHT US LLP (57) ABSTRACT

A flange, and a pipe and a flange structure and, more particularly, to a pipe and a flange structure, which allows the pipe connection and the assembling of an expansion valve of a vehicle air conditioner using two or more evaporators.

14 Claims, 6 Drawing Sheets

(56) References Cited

U.S. PATENT DOCUMENTS

| | | | | |
|---|---|---|---|---|
| 2005/0247359 A1* | 11/2005 | Hiser | ...................... | F16L 41/03 |
| | | | | 137/879 |
| 2010/0101671 A1* | 4/2010 | Osteen | .................... | F16L 41/03 |
| | | | | 137/861 |
| 2011/0012341 A1* | 1/2011 | Suhr | ....................... | F16L 39/00 |
| | | | | 285/124.3 |

FOREIGN PATENT DOCUMENTS

| | | | | |
|---|---|---|---|---|
| EP | 0659600 A1 | | 6/1995 | |
| FR | 2812930 A1 * | | 2/2002 | ............. F16L 39/00 |
| JP | H08-296778 A | | 11/1996 | |
| JP | 2008-101788 A | | 5/2008 | |
| JP | 2009-063230 A | | 3/2009 | |
| KR | 10-0737159 B1 | | 7/2007 | |
| KR | 10-1586776 B1 | | 1/2016 | |
| KR | 10-2020-0017783 A | | 2/2020 | |

\* cited by examiner

FLANGE, AND PIPE AND FLANGE STRUCTURE

CROSS REFERENCE TO RELATED APPLICATIONS

This application is a national phase under 35 U.S.C. § 371 of International Application No. PCT/KR2021/009992 filed on Jul. 30, 2021, which claims the benefit of priority from Korean Patent Application No. 10-2020-0096636 filed on Aug. 3, 2020. The entire contents of these applications are incorporated herein by reference in their entirety.

TECHNICAL FIELD

The present invention relates to a flange, and a pipe and flange structure, and more particularly, to a flange, and a pipe and flange structure, which easily enable the pipe connection and expansion valve assembly of a vehicle air conditioner that uses two or more n evaporators, increase the durability, and facilitate a flow of a refrigerant.

BACKGROUND ART

In general, a vehicle air conditioner may be a device for cooling or heating a vehicle interior by introducing air from a vehicle exterior into the vehicle interior or by heating or cooling air in a process of circulating air in the vehicle interior. Accordingly, an engine room may be provided with the air conditioner including an evaporator for cooling, a heater core for heating, and a door for supplying air cooled or heated by the evaporator or the heater core to each portion of the vehicle interior.

Research for maintaining comfort of the vehicle interior has been continued as not only the vehicle becomes more popular currently but also various types of vehicles such as autonomous vehicles are continuously being developed.

Figure 1:
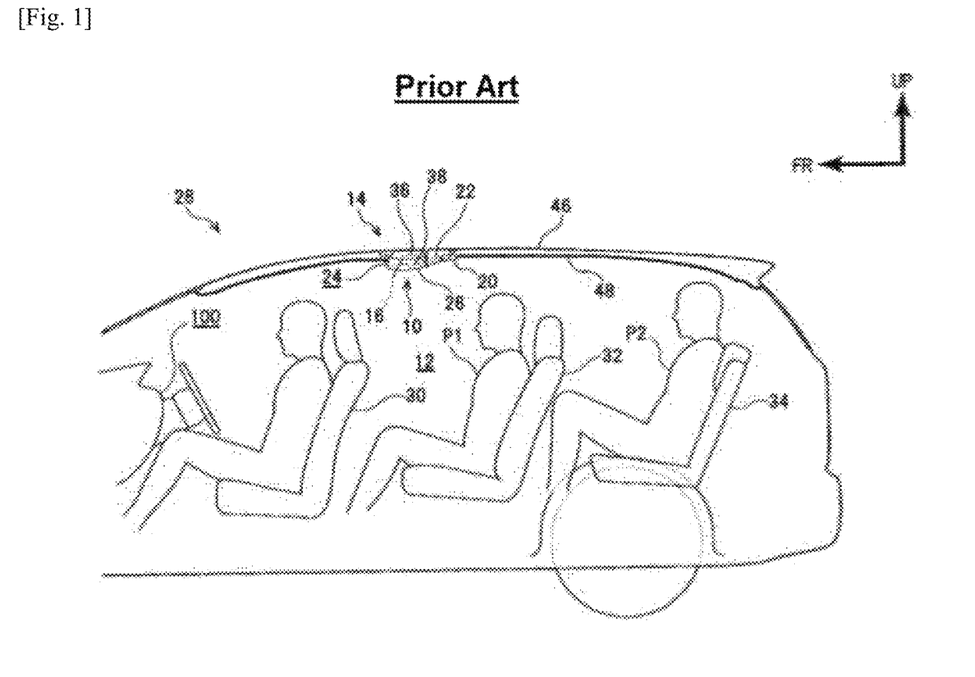
FIG. 1 is a view showing a conventional vehicle air conditioning device.

A ceiling-type vehicle air-conditioning device which may directly blow air into a vehicle has been proposed in KR 10-1586776 (published on Jan. 19, 2016), which is shown in FIG. 1. A conventional ceiling-type vehicle air conditioning device 10 shown in FIG. 1 includes: a fan 16 providing an air flow so that air from one side of the vehicle is introduced into a vehicle ceiling through an inlet 24 and transferred to an outlet 20 positioned on the other side of the vehicle; and a motor 36 driving the fan 16.

The ceiling-type vehicle air conditioning device may be a device enabling a temperature control effect generated on one side of the vehicle by an operation of an air conditioner positioned in the engine room to also be applied to the other side thereof, and operated together with the operation of the air conditioner positioned in the engine room.

However, such a ceiling-type vehicle air conditioning device only guides interior air from one side to the other side by the operation of the air conditioner positioned in the engine room, and thus has a limitation in rapidly adjusting a temperature of the other side because heat exchange is not performed directly. In addition, the entire vehicle interior may be inevitably cooled along with one side even when only the other side needs to be cooled.

In order to solve this problem, a device type using two or more heat exchangers has been proposed. However, this type has difficulty in assembling pipes for supplying a refrigerant to the evaporator and thus requires improvement.

RELATED ART DOCUMENT

Patent Document

KR 10-1586776 (Jan. 19, 2016)

DISCLOSURE

Technical Problem

An object of the present invention is to provide a flange, and a pipe and flange structure, and more particularly, to a flange, and a pipe and flange structure, which easily enable the pipe connection and expansion valve assembly of a vehicle air conditioner that uses two or more evaporators, increase the durability, and facilitate a flow of a refrigerant.

In particular, another object of the present invention is to provide a pipe and flange structure which may better facilitate a pipe formation and a case assembly process by positioning a first inlet and a second outlet, connected to an expansion valve, on one surface of a body to be parallel to each other, positioning a first outlet and a second inlet, respectively, on both surfaces of the body opposing each other among the remaining surfaces other than the one surface to be more easily connected to the plurality of evaporators, and including a first fixing part and a second fixing part in which divided connection portions of the pipe are fastened to each other by a fixing means when the pipe is long and thus divided into a plurality of pipes.

Still another object of the present invention is to provide a pipe and flange structure which may make a pipe have a more accurate fixed position by inserting and fastening, into a protrusion, a fastening reinforcement part positioned to be connected to a first outlet or a second inlet, and prevent in advance a pipe connection from being released by rotation after fastening.

Technical Solution

In one general aspect, a pipe and flange structure includes a flange for connecting an expansion valve and a pipe that transfers a refrigerant to an evaporator with each other, wherein the flange includes: a body; a supply passage including a first inlet and a first outlet positioned at both ends thereof for a refrigerant to be introduced from the expansion valve and supplied to the evaporator; a discharge passage including a second inlet and a second outlet positioned at both ends thereof for the refrigerant to be introduced from the evaporator and supplied to the expansion valve, the first inlet and the second outlet, connected to the expansion valve, are positioned on one surface of the body to be parallel to each other, and the first outlet and the second inlet are respectively positioned on both surfaces of the body opposing each other among the remaining surfaces other than the one surface.

In addition, the flange may include the supply passage and discharge passage spaced apart from each other by a predetermined distance in the height direction.

In addition, the pipe may be fixed by welding or caulking when one pipe connects the flange and the evaporator with each other in the pipe and flange structure.

In addition, the pipe connecting the flange and the evaporator with each other may be divided into two or more pipes in the pipe and flange structure, and a first fixing part and a second fixing part fixed to each other by a fixing means may be respectively positioned at connection portions of two pipes.

In addition, the fixing means may use a bolt and a nut.

In addition, the structure may further include a fastening reinforcement part positioned at an end of the pipe, connected to the first outlet or the second inlet, when the pipe connected to the first outlet or second inlet of the flange is divided into two or more pipes in the pipe and flange structure.

In addition, the body may include: an extension part extending from a predetermined region in the height direction where the first outlet or second inlet of the flange is positioned, in a direction opposite to the surface to which the expansion valve is connected; and a protrusion protruding parallel to the first outlet or second inlet of the flange from the extension part in an outward direction in which the first outlet or second inlet is positioned, and the fastening reinforcement part may be positioned to correspond to the extension part, and include a fixing groove into which the protrusion is inserted.

In addition, the two or more evaporators may be connected in series with each other in the pipe and flange structure.

In addition, the pipe connecting the two evaporators to each other may be divided into two or more pipes in the pipe and flange structure, and the first fixing part and the second fixing part fixed to each other by the fixing means may respectively be positioned at connection portions of two pipes.

In another general aspect, a flange includes a body; two or more passages passing through the inside of the body; and a fluid inlet and a fluid outlet respectively positioned at both ends of each of the passages, wherein the inlet and outlet of each of the passages are positioned on different surfaces of the body.

In addition, the passages may include one supply passage and one discharge passage, the supply passage may include a first inlet which is the fluid inlet and a first outlet which is the fluid outlet that are positioned at both ends thereof, and the discharge passage may include a second inlet which is the fluid inlet and a second outlet which is the fluid outlet that are positioned at both ends of thereof, the first inlet and the second outlet may be positioned on one surface of the body to be parallel to each other, and the first outlet and the second inlet may be positioned on the remaining surfaces of the body other than the one surface.

In addition, the first outlet and the second inlet may be positioned on both surfaces of the body opposing each other among the remaining surfaces other than the one surface.

In addition, the first outlet and the second inlet may be positioned on the surfaces of the body opposing each other.

In addition, the supply passage and the discharge passage may be spaced apart from each other in the height direction.

In addition, the flange may further include: an extension part in which a predetermined region corresponding to the first outlet or the second inlet protrudes from the body; and a coupling part positioned on the extension part.

In addition, the coupling part may protrude from the extension part in a direction in which the first outlet or the second inlet is positioned.

Advantageous Effects

As set forth above, the flange, and the pipe and flange structure of the present invention may easily enable the pipe connection and expansion valve assembly of the vehicle air conditioner that uses two or more evaporators, increase the durability, and facilitate the flow of the refrigerant.

In particular, the pipe and flange structure of the present invention may better facilitate the pipe formation and the assembly process by positioning the first inlet and the second outlet, connected to the expansion valve, on one surface of the body to be parallel to each other, positioning the first outlet and the second inlet, respectively, on both surfaces opposing each other among the remaining surfaces other than the one surface to be more easily connected to the plurality of evaporators, and including the first fixing part and the second fixing part in which the divided connection portions of the pipe are fastened to each other by the fixing means when the pipe is long and thus divided into the plurality of pipes.

In addition, the pipe and flange structure of the present invention may make the pipe have the more accurate fixed position by inserting and fastening, into the protrusion, the fastening reinforcement part positioned to be connected to the first outlet or the second inlet, and prevent in advance the pipe connection from being released by the rotation after the fastening.

BEST MODE

Hereinafter, a flange, and a pipe and flange structure of the present invention having the configuration as described above will be described in detail with reference to the accompanying drawings.

Figure 2:
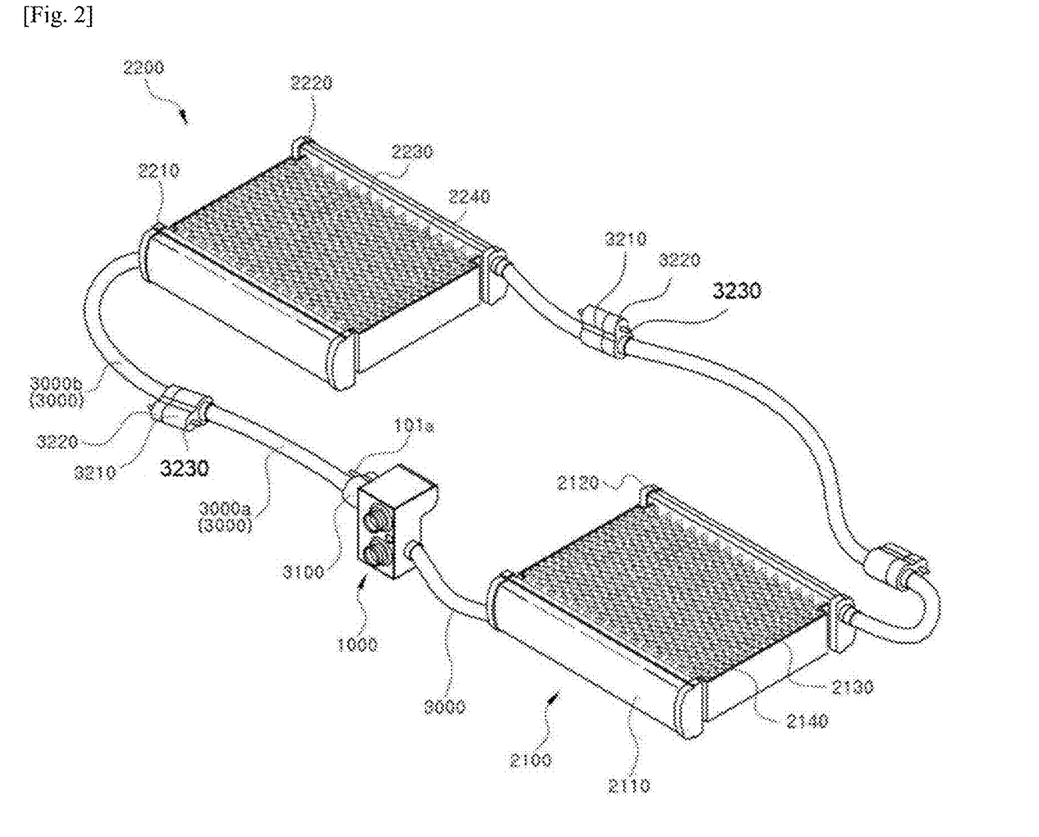
FIG. 2 is a view showing a pipe and flange structure according to the present invention.
Figure 3:
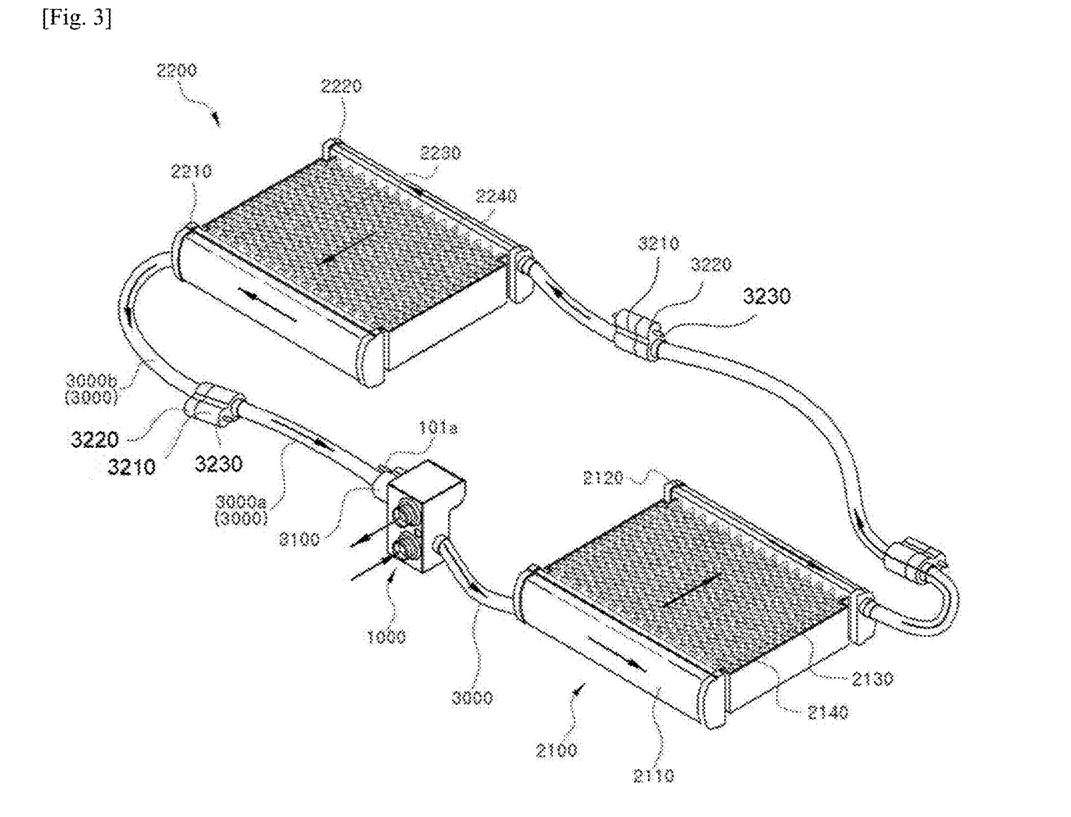
FIG. 3 is a view showing a flow of a refrigerant in the pipe and flange structure according to the present invention.
Figure 4:
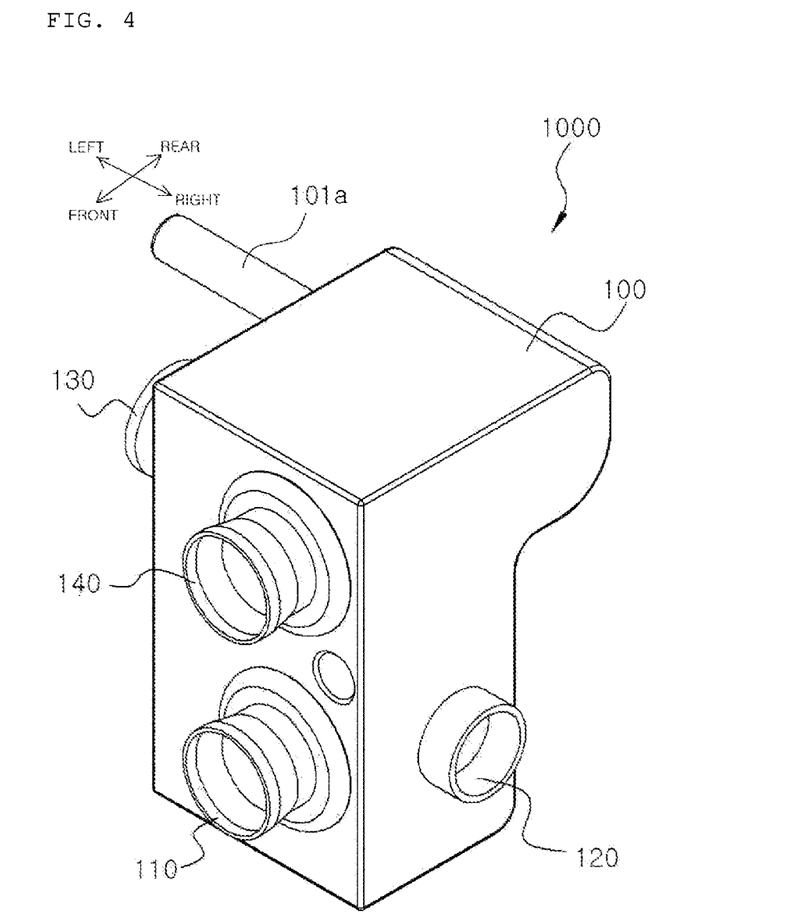
FIG. 4 is a perspective view showing a flange according to the present invention.
Figure 5:
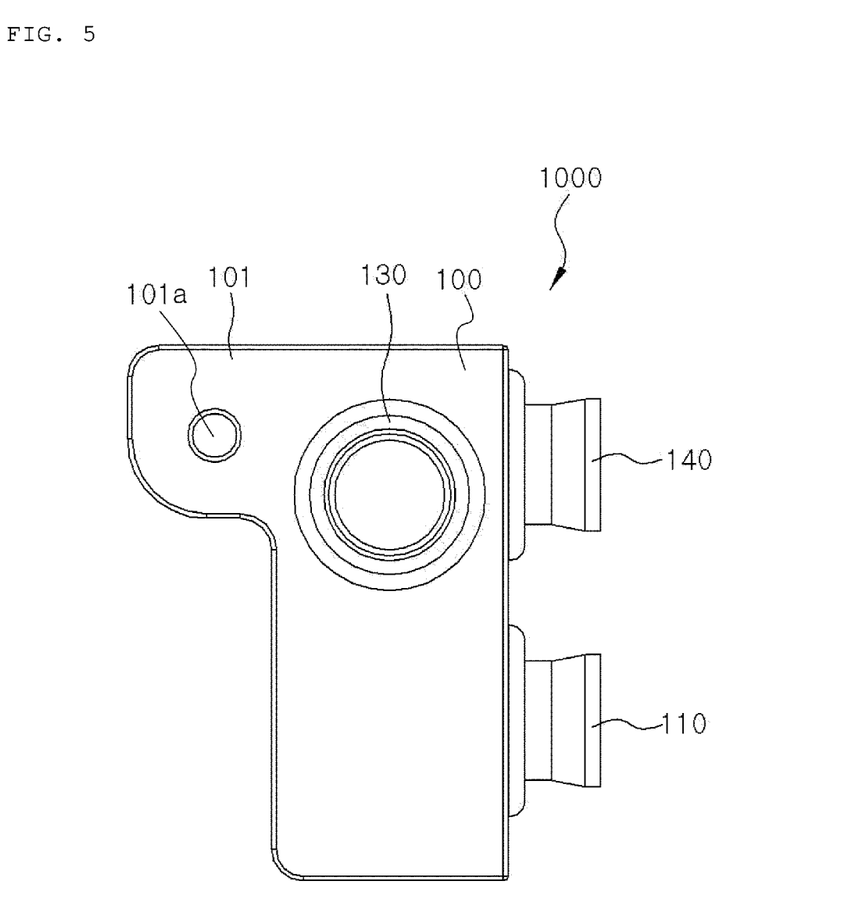
FIGS. 5 and 6 are left and right plan views of the flange shown in FIG. 4, respectively.
Figure 6:
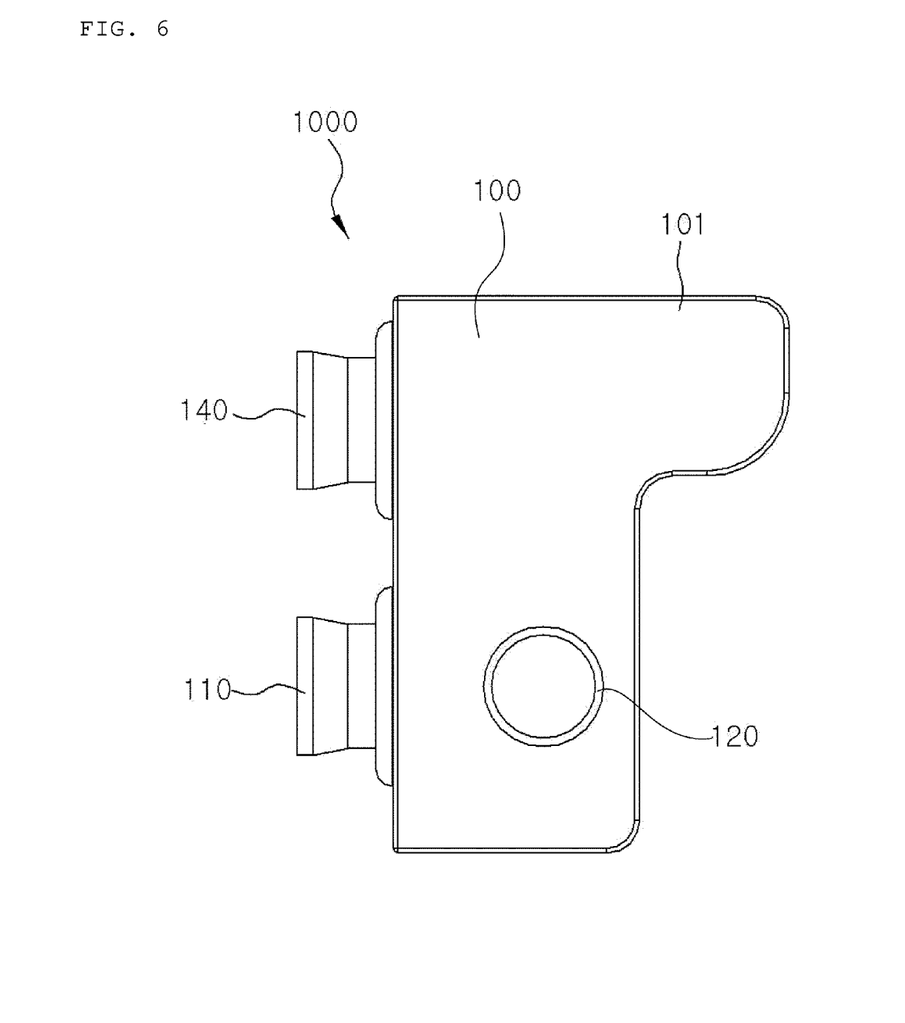

FIG. 2 is a view showing a pipe and flange structure according to the present invention; FIG. 3 is a view showing a flow of a refrigerant in the pipe and flange structure according to the present invention; FIG. 4 is a perspective view showing a flange 1000 according to the present invention; and FIGS. 5 and 6 are left and right plan views of the flange 1000 shown in FIG. 4, respectively.

The pipe and flange structure of the present invention may include a pipe 3000 that transfers a refrigerant an evaporator 2100 or 2200 used in a vehicle air conditioner, and a flange 1000 for connecting an expansion valve and the pipe with each other. In particular, the pipe and flange structure of the present invention may be mounted on a vehicle ceiling, and easily applied to a device type using two or more evaporators 2100 and 2200 positioned in series.

The pipe 3000 may be a part for transferring the refrigerant to evaporators 2100 and 2200, and connecting the flange 1000 and the evaporator 2100 or 2200 with each other or connecting the two evaporators 2100 and 2200 with each other.

The flange 1000 may be a part for connecting the expansion valve and the pipe 3000 that transfers the refrigerant to the evaporator 2100 or 2200 with each other, and include a basic body 100.

The body 100 may have components through which the refrigerant is introduced or discharged to be connected to the pipe 3000 and the expansion valve. In more detail, the body 100 may have a supply passage for supplying the refrigerant from the expansion valve to the evaporator 2100 or 2200 and a discharge passage for discharging (supplying) the refrigerant from the evaporator 2100 or 2200 to the expansion valve.

The supply passage may include a first inlet 110 and a first outlet 120 positioned at both ends thereof for the refrigerant to be introduced from the expansion valve and supplied to the evaporator 2100 or 2200. Here, the first inlet 110 may be connected to the expansion valve, and the first outlet 120 may be connected to the pipe 3000 connected to the evaporator 2100 or 2200.

The discharge passage may include a second inlet 130 and a second outlet 140 positioned at both ends thereof for the refrigerant to be introduced from the evaporator 2100 or 2200 and discharged to the expansion valve. Here, the second inlet 130 may be connected to the pipe 3000 connected to the evaporator 2100 or 2200, and the second outlet 140 may be connected to the expansion valve.

Here, in the pipe and flange structure of the present invention, the first inlet 110 and the second outlet 140, connected to the expansion valve, may be positioned on one surface of the body 100 to be parallel to each other, and more specifically, may be positioned in the height direction to correspond to a shape of the expansion valve. In addition, the first outlet 120 and the second inlet 130 may respectively be positioned on both surfaces of the body 100 opposing each other among the remaining surfaces other than the one surface (the surface on which the first inlet 110 and the second outlet 140 are positioned and connected to the expansion valve) to facilitate connection between the pipes 3000 connected to the evaporators 2100 and 2200.

FIGS. 2 to 6 exemplify that one surface connected to the expansion valve is a front surface of the body 100, the second inlet 130 is positioned on the left surface, and the first outlet 120 is positioned on the right surface.

That is, the supply passage and the discharge passage may be spaced apart from each other by a predetermined distance in the height direction, each have an "L" shape, and be symmetrical to each other in the left-right direction.

The pipe and flange structure of the present invention may include two or more evaporators 2100 and 2200. In this case, the first outlet 120 and the second inlet 130 connected to the pipes 3000 connected the to evaporators 2100 and 2200, may respectively be positioned on both the surfaces opposing each other, thereby facilitating the connection between the pipes 3000 and preventing excessive bending of the pipe 3000.

The drawing exemplifies that the supply passage is positioned lower in the height direction and the discharge passage is positioned higher in the height direction, which is an example, and vice versa.

Meanwhile, the pipe 3000 may be fixed by welding or caulking when one pipe 3000 connects the flange 1000 and the evaporator 2100 or 2200 with each other in the pipe and flange structure of the present invention. (FIGS. 2 and 3 exemplify that the pipe is fixed directly by welding or caulking in a state where the pipe connects the first outlet 120 and the first evaporator 2100 with each other. This configuration is suitable for a case of a short distance between the flange 1000 and the evaporator 2100 or 2200.)

In addition, the pipe and flange structure may further include a fastening reinforcement part 3100 positioned at an end of the pipe 3000, connected to the first outlet 120 or the second inlet 130, when the pipe 3000 connected to the first outlet 120 or second inlet 130 of the flange 1000 is divided into two or more pipes. The fastening reinforcement part 3100 may be a part positioned at the end of the pipe 3000 to reinforce the pipe 3000

Here, the body 100 may include: an extension part 101 extending from a predetermined region in the height direction where the first outlet 120 or second inlet 130 of the flange 1000 is positioned, in a direction opposite to the surface to which the expansion valve is connected; and a protrusion 101a protruding parallel to the first outlet 120 or second inlet 130 of the flange 1000 from the extension part 101 in an outward direction in which the first outlet 120 or second inlet 130 is positioned, and the fastening reinforcement part 3100 may correspond to the extension part 101, and include a fixing groove (not shown) into which the protrusion 101a is inserted.

The drawing shows a device type in which the pipe 3000 connected to the evaporator 2100 or 2200 that is connected with the second inlet 130 is divided into two pipes. The extension part 101 may extend from a region where the second inlet 130 is positioned, which is higher in the height direction of the body 100, in a rearward direction, and the protrusion 101a may be positioned on the left side of the extension part 101, that is, on the left of the surface where the second inlet 130 is positioned while being parallel to the second inlet 130.

The fastening reinforcement part 3100 may also have a size corresponding to that of the extension part 101 positioned on the body 100, and have a fixing groove into which the protrusion 101a is inserted and fixed. In this way, in the pipe and flange structure of the present invention, the protrusion 101a may be inserted into the fixing groove to make the pipe 3000 have an accurate fixed position and prevent rotation of the pipe, thereby preventing the fastening from being released by a vehicle vibration, or the like. In addition, a screw thread may be positioned on an outer circumferential surface of the protrusion 101a, and a means such as a separate bolt may be fastened thereto to further increase a fixing force. That is, the protrusion 101a may serve as a coupling part for coupling and fixing another object to the flange 1000.

In addition, the pipe 3000 connecting the flange 1000 and the evaporator 2100 or 2200 may be long and thus be divided into two or more pipes in the pipe and flange structure of the present invention, and in this case, a first fixing part 3210 and a second fixing part 3220 fixed to each other by a fixing means 3230 may respectively be positioned at connection portions of the two pipes 3000. The fixing means 3230 may use a bolt and a nut. Here, the pipe and flange structures of the present invention may use the bolt integrally formed with one of the first fixing part 3210 and the second fixing part 3220, the bolt passing through both the first fixing part 3210 and the second fixing part 3220 and then fixed by the nut, or various other ways in which the two fixing parts are fixed to each other by fastening in addition thereto.

FIGS. 2 and 3 exemplify the two evaporators 2100 and 2200 are provided, in which each evaporator is denoted by reference number 2100 or 2200. The two evaporators 2100 and 2200 may have the same shape. In more detail, the evaporator 2100, positioned first based on the flow of the refrigerant, may include a pair of first header tanks 2110 and 2120 spaced apart from each other by a predetermined distance, a first tube 2130 having both ends fixed to the first header tanks 2110 and 2120, and a first pin 2140 interposed between the first tubes 2130; and the evaporator 2200 positioned second may include a pair of second header tanks 2210 and 2220 spaced apart from each other by a predetermined distance, a second tube 2230 having both ends fixed to the second header tanks 2210 and 2220, and a second fin 2240 interposed between the second tubes 2230.

The flow of the refrigerant may be described as follows with reference to FIG. 3: the refrigerant passed through the expansion valve may sequentially pass through the two or more evaporators 2100 and 2200 through the supply passage of the flange 1000 (or sequentially through the first inlet 110 and the first outlet 120) and the pipe 3000, and then be transferred to the expansion valve through the discharge passage of the flange 1000 (or sequentially through the second inlet 130 and the second outlet 140).

Meanwhile, the pipe 3000 connecting the two evaporators 2100 and 2200 to each other may also be divided into two or more pipes in the pipe and flange structure of the present invention, and in this case, the first fixing part 3210 and the second fixing part 3220 fixed to each other by the fixing means 3230 may respectively be positioned at connection portions of the two pipes 3000. As such, in the pipe and flange structure of the present invention, the pipe 3000 may be long and thus be divided into the plurality of pipes. In this case, the first fixing part 3210 and the second fixing part 3220 may be fastened to each other by the fixing means 3230 positioned at divided connection portions, thereby better facilitating the connections between the pipes 3000 and the case assembling process.

In addition, the flange according to the present invention may be used for connection structures of various objects other than its purpose to connect the pipe that transfers the refrigerant to the evaporator and the expansion valve with each other.

The present invention is not limited to the above-mentioned exemplary embodiments, and may be variously applied. In addition, the present invention may be variously modified by those skilled in the art to which the present invention pertains without departing from the gist of the present invention claimed in the claims.

DESCRIPTION OF REFERENCE NUMERALS

1000: flange, 100: body, 101: extension part
101*a*: protrusion, 110: first inlet, 120: first outlet
130: second inlet, 140: second outlet
2100, 2200: evaporator, 2110, 2120: first header tank
2130: first tube, 2140: first fin
2210, 2220: second header tank, 2230: second tube, 2240: first fin
3000: pipe (3000*a*, 3000*b*), 3100: fastening reinforcement part
3210: first fixing part, 3220: second fixing part, 3230: fixing means

The invention claimed is:

1. A pipe and flange structure comprising a flange for connecting an expansion valve and a pipe that transfers a refrigerant to an evaporator with each other, wherein the flange includes:
 a body;
 a supply passage including a first inlet and a first outlet, wherein the first inlet is formed at one end and the first outlet is formed at another end thereof for a refrigerant to be introduced from the expansion valve and supplied to the evaporator;
 a discharge passage including a second inlet and a second outlet, wherein the second inlet is formed at one end and the second outlet is formed at another end thereof for the refrigerant to be introduced from the evaporator and supplied to the expansion valve,
 the first inlet and the second outlet, connected to the expansion valve, are positioned on one surface of the body to be parallel to each other, and
 the first outlet and the second inlet are formed on the remaining surfaces except the one surface, but among the surfaces facing each other, the first outlet is formed on one surface and the second inlet is formed on the other surface,
 wherein the pipe connecting the flange and the evaporator with each other is divided into two or more pipes in the pipe and flange structure, and a first fixing part and a second fixing part fixed to each other by a fixing means are respectively positioned at connection portions of the two or more pipes.

2. The structure of claim 1, wherein the flange includes the supply passage and discharge passage spaced apart from each other by a predetermined distance in a height direction.

3. The structure of claim 1, wherein the two or more pipes are fixed by welding or caulking when the two or more pipes connect the flange and the evaporator with each other in the pipe and flange structure.

4. The structure of claim 1, wherein the fixing means uses a bolt and a nut.

5. The structure of claim 1, further comprising a fastening reinforcement part positioned at an end of each pipe, connected to the first outlet or the second inlet.

6. The structure of claim 5, wherein the body includes: an extension part extending from a predetermined region in a height direction where the first outlet or second inlet of the flange is positioned, in a direction opposite to the surface to which the expansion valve is connected; and a protrusion protruding parallel to the first outlet or second inlet of the flange from the extension part in an outward direction in which the first outlet or second inlet is positioned, and
 the fastening reinforcement part is positioned to correspond to the extension part, and includes a fixing groove into which the protrusion is inserted.

7. The structure of claim 1, wherein two or more evaporators are connected in series with each other.

8. The structure of claim 7, wherein the two evaporators are connected by the two or more pipes in the pipe and flange structure.

9. A flange comprising:
 a body;
 two or more passages passing through the inside of the body; and
 a fluid inlet and a fluid outlet respectively positioned at ends of each of the two or more passages,
 wherein the inlet and outlet of each of the two or more passages are positioned on different surfaces of the body,
 wherein the two or more passages include one supply passage and one discharge passage,
 the supply passage includes a first inlet which is the fluid inlet and a first outlet which is the fluid outlet, and the first inlet is formed at one end and the first outlet is formed at another end thereof, and the discharge passage includes a second inlet which is the fluid inlet and a second outlet which is the fluid outlet and the second inlet is formed at one end and the second outlet is formed at another end thereof,
 the first inlet and the second outlet are positioned on one surface of the body to be parallel to each other, and
 the first outlet and the second inlet are positioned on the remaining surfaces of the body other than the one surface,
 the flange further comprising:

an extension part in which a predetermined region corresponding to the first outlet or the second inlet protrudes from the body; and a coupling part positioned on the extension part, wherein the coupling part protrudes from the extension part in a direction in which the first outlet or the second inlet is positioned.

10. The flange of claim 9, wherein the first outlet and the second inlet are formed on the remaining surfaces except the one surface, but among the surfaces facing each other, the first outlet is formed on one surface and the second inlet is formed on the other surface.

11. The flange of claim 10, wherein the first outlet and the second inlet are positioned on the surfaces of the body opposing each other.

12. The flange of claim 9, wherein the supply passage and the discharge passage are spaced apart from each other in a height direction.

13. A pipe and flange structure comprising a flange for connecting an expansion valve and a pipe that transfers a refrigerant to an evaporator with each other, wherein the flange includes:

a body;

a supply passage including a first inlet and a first outlet and the first inlet is formed at one end and the first outlet is formed at another end thereof for a refrigerant to be introduced from the expansion valve and supplied to the evaporator;

a discharge passage including a second inlet and a second outlet and the second inlet is formed at one end and the second outlet is formed at another end thereof for the refrigerant to be introduced from the evaporator and supplied to the expansion valve, the first inlet and the second outlet, connected to the expansion valve, are positioned on one surface of the body to be parallel to each other, and the first outlet and the second inlet are formed on the remaining surfaces except the one surface, but among the surfaces facing each other, the first outlet is formed on one surface and the second inlet is formed on the other surface, wherein the pipe and flange structure further comprising a fastening reinforcement part positioned at an end of the pipe, connected to the first outlet or the second inlet, when the pipe connected to the first outlet or second inlet of the flange is divided into two or more pipes.

14. A pipe and flange structure comprising a flange for connecting an expansion valve and a pipe that transfers a refrigerant to an evaporator with each other, wherein the flange includes:

a body;

a supply passage including a first inlet and a first outlet and the first inlet is formed at one end and the first outlet is formed at another end thereof for a refrigerant to be introduced from the expansion valve and supplied to the evaporator;

a discharge passage including a second inlet and a second outlet and the second inlet is formed at one end and the second outlet is formed at another end thereof for the refrigerant to be introduced from the evaporator and supplied to the expansion valve, the first inlet and the second outlet, connected to the expansion valve, are positioned on one surface of the body to be parallel to each other, and the first outlet and the second inlet are formed on the remaining surfaces except the one surface, but among the surfaces facing each other, the first outlet is formed on one surface and the second inlet is formed on the other surface, wherein two or more evaporators are connected in series with each other, wherein the pipe connecting the two or more evaporators to each other is divided into two or more pipes in the pipe and flange structure, and a first fixing part and a second fixing part fixed to each other by fixing means are respectively positioned at connection portions of the two or more pipes.

\* \* \* \* \*